United States Patent
Thorstensen-Woll

(10) Patent No.: US 10,899,506 B2
(45) Date of Patent: Jan. 26, 2021

(54) SINGLE ALUMINUM TAMPER INDICATING TABBED SEALING MEMBER

(71) Applicant: Selig Sealing Products, Inc., Forrest, IL (US)

(72) Inventor: Robert William Thorstensen-Woll, Barrie (CA)

(73) Assignee: Selig Sealing Products, Inc., Forrest, IL (US)

( * ) Notice: Subject to any disclaimer, the term of this patent is extended or adjusted under 35 U.S.C. 154(b) by 0 days.

(21) Appl. No.: 16/345,002

(22) PCT Filed: Oct. 26, 2017

(86) PCT No.: PCT/US2017/058521
§ 371 (c)(1),
(2) Date: Apr. 25, 2019

(87) PCT Pub. No.: WO2018/081419
PCT Pub. Date: May 3, 2018

(65) Prior Publication Data
US 2019/0270547 A1 Sep. 5, 2019

Related U.S. Application Data

(60) Provisional application No. 62/414,547, filed on Oct. 28, 2016.

(51) Int. Cl.
*B65D 43/02* (2006.01)
*B65D 51/20* (2006.01)
*B65D 53/04* (2006.01)

(52) U.S. Cl.
CPC ............. *B65D 43/02* (2013.01); *B65D 51/20* (2013.01); *B65D 53/04* (2013.01); *B32B 2439/70* (2013.01); *B65D 2401/15* (2020.05)

(58) Field of Classification Search
CPC ........ B65D 43/02; B65D 51/20; B65D 53/04; B65D 2101/0023; B32B 2439/70
See application file for complete search history.

(56) References Cited

U.S. PATENT DOCUMENTS

| | | |
|---|---|---|
| 1,818,379 A | 8/1931 | Cain |
| 2,768,762 A | 10/1956 | Guinet |
| 3,235,165 A | 2/1966 | Jackson |

(Continued)

FOREIGN PATENT DOCUMENTS

| | | |
|---|---|---|
| AT | 501393 A1 | 8/2006 |
| AT | 11738 U1 | 4/2011 |

(Continued)

OTHER PUBLICATIONS

U.S. Appl. No. 15/107,560, entitled "Dual Aluminum Tamper Indicating Tabbed Sealing Member," which entered the U.S. national phase from International Application No. PCT/US2015/014363, filed on Feb. 4, 2015, which published as US 2016/0325896 A1 on Nov. 10, 2016.

(Continued)

*Primary Examiner* — Michael C Miggins
(74) *Attorney, Agent, or Firm* — Fitch, Even, Tabin & Flannery, LLP

(57) ABSTRACT

A tamper evident tabbed sealing member for sealing to a rim surrounding a container opening is described that includes a multi-layer laminate configured to isolate a residual ring of material that remains on a container land area upon seal removal.

18 Claims, 8 Drawing Sheets

(56) References Cited

U.S. PATENT DOCUMENTS

| | | |
|---|---|---|
| 3,292,828 A | 12/1966 | Stuart |
| 3,302,818 A | 2/1967 | Balocca et al. |
| 3,460,310 A | 8/1969 | Adcock et al. |
| 3,556,816 A | 1/1971 | Nughes |
| 3,964,670 A | 6/1976 | Amneus |
| 3,990,603 A | 11/1976 | Brochman |
| 4,133,796 A | 1/1979 | Bullman |
| 4,206,165 A | 6/1980 | Dukess |
| 4,266,687 A | 5/1981 | Cummings |
| 4,396,655 A | 8/1983 | Graham |
| 4,556,590 A | 12/1985 | Martin |
| 4,582,735 A | 4/1986 | Smith |
| 4,588,099 A | 5/1986 | Diez |
| 4,595,116 A | 6/1986 | Carlsson |
| 4,596,338 A | 6/1986 | Yousif |
| 4,636,273 A | 1/1987 | Wolfersperger |
| 4,666,052 A | 5/1987 | Ou-Yang |
| 4,693,390 A | 9/1987 | Hekal |
| 4,735,335 A | 4/1988 | Torterotot |
| 4,741,791 A | 5/1988 | Howard |
| 4,762,246 A | 8/1988 | Ashley |
| 4,770,325 A | 9/1988 | Gordon |
| 4,771,903 A | 9/1988 | Levene |
| 4,781,294 A | 11/1988 | Croce |
| 4,801,647 A | 1/1989 | Wolfe, Jr. |
| 4,811,856 A | 3/1989 | Fischman |
| 4,818,577 A | 4/1989 | Ou-Yang |
| 4,837,061 A | 6/1989 | Smits |
| 4,863,061 A | 9/1989 | Moore |
| 4,867,881 A | 9/1989 | Kinzer |
| 4,889,731 A | 12/1989 | Williams |
| 4,934,544 A | 6/1990 | Han |
| 4,938,390 A | 7/1990 | Markva |
| 4,960,216 A | 10/1990 | Giles |
| 4,961,986 A | 10/1990 | Galda |
| 5,004,111 A | 4/1991 | McCarthy |
| 5,015,318 A | 5/1991 | Smits |
| 5,053,457 A | 10/1991 | Lee |
| 5,055,150 A | 10/1991 | Rosenfeld |
| 5,057,365 A | 10/1991 | Finkelstein |
| 5,071,710 A | 12/1991 | Smits |
| 5,098,495 A | 3/1992 | Smits |
| RE33,893 E | 4/1992 | Elias |
| 5,106,124 A | 4/1992 | Volkman |
| 5,125,529 A | 6/1992 | Torterotot |
| 5,131,556 A | 7/1992 | Iioka |
| 5,149,386 A | 9/1992 | Smits |
| 5,178,967 A | 1/1993 | Rosenfeld |
| 5,197,618 A | 3/1993 | Goth |
| 5,217,790 A | 6/1993 | Galda |
| 5,226,281 A | 7/1993 | Han |
| 5,261,990 A | 11/1993 | Galda |
| 5,265,745 A | 11/1993 | Pereyra |
| 5,433,992 A | 7/1995 | Galda |
| 5,513,781 A | 5/1996 | Ullrich |
| 5,514,442 A | 5/1996 | Galda |
| 5,560,989 A | 10/1996 | Han |
| 5,598,940 A | 2/1997 | Finkelstein |
| 5,601,200 A | 2/1997 | Finkelstein |
| 5,615,789 A | 4/1997 | Finkelstein |
| 5,618,618 A | 4/1997 | Murschall |
| 5,669,521 A | 9/1997 | Wiening |
| 5,683,774 A | 11/1997 | Faykish |
| 5,702,015 A | 12/1997 | Giles |
| 5,709,310 A | 1/1998 | Kretz |
| 5,776,284 A | 7/1998 | Sykes |
| 5,851,333 A | 12/1998 | Fagnant |
| 5,860,544 A | 1/1999 | Brucker |
| 5,871,112 A | 2/1999 | Giles |
| 5,887,747 A | 3/1999 | Burklin |
| 5,915,577 A | 6/1999 | Levine |
| 5,975,304 A | 11/1999 | Cain |
| 5,976,294 A | 11/1999 | Fagnant |
| 6,056,141 A | 5/2000 | Navarini |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,290,801 B1 | 9/2001 | Krampe |
| 6,312,776 B1 | 11/2001 | Finkelstein |
| 6,378,715 B1 | 4/2002 | Finkelstein |
| 6,458,302 B1 | 10/2002 | Shifflet |
| 6,461,714 B1 | 10/2002 | Giles |
| 6,544,615 B2 | 4/2003 | Otten |
| 6,548,302 B1 | 4/2003 | Mao |
| 6,602,309 B2 | 8/2003 | Vizulis |
| 6,627,273 B2 | 9/2003 | Wolf |
| 6,669,046 B1 | 12/2003 | Sawada |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko |
| 6,902,075 B2 | 6/2005 | OBrien |
| 6,916,516 B1 | 7/2005 | Gerber |
| 6,955,736 B2 | 10/2005 | Rosenberger |
| 6,959,832 B1 | 11/2005 | Sawada |
| 6,974,045 B1 | 12/2005 | Trombach |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,731,048 B2 | 6/2010 | Teixeira Alvares |
| 7,740,730 B2 | 6/2010 | Schedl |
| 7,740,927 B2 | 6/2010 | Yousif |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Woll |
| 8,025,171 B2 | 9/2011 | Cassol |
| 8,057,896 B2 | 11/2011 | Smelko |
| 8,129,009 B2 | 3/2012 | Morris |
| 8,201,385 B2 | 6/2012 | McLean |
| 8,308,003 B2 | 11/2012 | O'Brien |
| 8,329,288 B2 | 12/2012 | Allegaert |
| 8,348,082 B2 | 1/2013 | Cain |
| 8,541,081 B1 | 9/2013 | Ranganathan |
| 8,715,825 B2 | 5/2014 | Thorstensen-Woll |
| 8,906,185 B2 | 12/2014 | McLean |
| 8,944,264 B2 | 2/2015 | Frishman |
| 9,028,963 B2 | 5/2015 | Thorstensen-Woll |
| 9,102,438 B2 | 8/2015 | Thorstensen-Woll |
| 9,193,513 B2 | 11/2015 | Thorstensen-Woll |
| 9,221,579 B2 | 12/2015 | Thorstensen-Woll |
| 9,227,755 B2 | 1/2016 | Thorstensen-Woll |
| 9,440,765 B2 | 9/2016 | Thorstensen-Woll |
| 9,440,768 B2 | 9/2016 | Thorstensen-Woll |
| 9,533,805 B2 | 1/2017 | McLean |
| 9,676,513 B2 | 6/2017 | Thorstensen-Woll |
| 2001/0023870 A1 | 9/2001 | Mihalov |
| 2001/0031348 A1 | 10/2001 | Jud |
| 2002/0068140 A1 | 6/2002 | Finkelstein |
| 2003/0087057 A1 | 5/2003 | Blemberg |
| 2003/0168423 A1 | 9/2003 | Williams |
| 2003/0196418 A1 | 10/2003 | O'Brien |
| 2004/0028851 A1 | 2/2004 | Okhai |
| 2004/0043238 A1 | 3/2004 | Wuest |
| 2004/0109963 A1 | 6/2004 | Zaggia |
| 2004/0197500 A9 | 10/2004 | Swoboda |
| 2004/0211320 A1 | 10/2004 | Cain |
| 2005/0003155 A1 | 1/2005 | Huffer |
| 2005/0048307 A1 | 3/2005 | Schubert |
| 2005/0208242 A1 | 9/2005 | Smelko |
| 2005/0208244 A1 | 9/2005 | Delmas |
| 2005/0218143 A1 | 10/2005 | Niederer |

(56) References Cited

U.S. PATENT DOCUMENTS

| | | |
|---|---|---|
| 2005/0279814 A1 | 12/2005 | Drummond |
| 2006/0000545 A1 | 1/2006 | Nageli |
| 2006/0003120 A1 | 1/2006 | Nageli |
| 2006/0003122 A1 | 1/2006 | Nageli |
| 2006/0068163 A1 | 3/2006 | Giles |
| 2006/0124577 A1 | 6/2006 | Ross |
| 2006/0151415 A1 | 7/2006 | Smelko |
| 2006/0278665 A1 | 12/2006 | Bennett |
| 2007/0003725 A1 | 1/2007 | Yousif |
| 2007/0007229 A1 | 1/2007 | Yousif |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0145581 A1 | 6/2008 | Tanny |
| 2008/0156443 A1 | 7/2008 | Schaefer |
| 2008/0169286 A1 | 7/2008 | McLean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Wall |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | McLean |
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | OBrien |
| 2010/0213193 A1 | 8/2010 | Helmlinger |
| 2010/0221483 A1 | 9/2010 | Gonzalez Carro |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | McLean |
| 2011/0147353 A1 | 6/2011 | Kornfeld |
| 2011/0152821 A1 | 6/2011 | Kornfeld |
| 2012/0000910 A1 | 1/2012 | Ekkert |
| 2012/0043330 A1 | 2/2012 | McLean |
| 2012/0067896 A1 | 3/2012 | Daffner |
| 2012/0070636 A1 | 3/2012 | Thorstensen-Woll |
| 2012/0103988 A1 | 5/2012 | Wiening |
| 2012/0111758 A1 | 5/2012 | Lo |
| 2012/0241449 A1 | 9/2012 | Frischmann |
| 2012/0285920 A1 | 11/2012 | McLean |
| 2012/0312818 A1 | 12/2012 | Ekkert |
| 2013/0020324 A1 | 1/2013 | Thorstensen-Woll |
| 2013/0020328 A1 | 1/2013 | Duan |
| 2013/0121623 A1 | 5/2013 | Lyzenga |
| 2013/0177263 A1 | 7/2013 | Duan |
| 2014/0001185 A1 | 1/2014 | McLean |
| 2014/0061196 A1 | 3/2014 | Thorstensen-Woll |
| 2014/0061197 A1 | 3/2014 | Thorstensen-Woll |
| 2014/0186589 A1 | 7/2014 | Chang |
| 2014/0224800 A1 | 8/2014 | Thorstensen-Woll et al. |
| 2015/0053680 A1 | 2/2015 | Yuno |
| 2015/0197385 A1 | 7/2015 | Wei |
| 2015/0225116 A1 | 8/2015 | Thorstensen-Woll |
| 2015/0321808 A1 | 11/2015 | Thorstensen-Woll |
| 2016/0185485 A1 | 6/2016 | Thorstensen-Woll |
| 2017/0253373 A1 | 9/2017 | Thorstensen-Woll |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| CA | 2203744 A1 | 10/1997 |
| CA | 2297840 A1 | 2/1999 |
| CN | 1301289 A | 6/2001 |
| CN | 1639020 A | 7/2005 |
| CN | 103193026 A | 7/2013 |
| CN | 104853994 A | 8/2015 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0135431 A1 | 3/1985 |
| EP | 0577432 A1 | 1/1994 |
| EP | 0668221 A1 | 8/1995 |
| EP | 0826598 A2 | 3/1998 |
| EP | 0826599 A2 | 3/1998 |
| EP | 0905039 A1 | 3/1999 |
| EP | 0717710 B1 | 4/1999 |
| EP | 0915026 A1 | 5/1999 |
| EP | 0706473 B1 | 8/1999 |
| EP | 1075921 A2 | 2/2001 |
| EP | 1199253 A2 | 4/2002 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1935636 A1 | 6/2008 |
| EP | 1968020 A1 | 9/2008 |
| EP | 1992476 A1 | 11/2008 |
| EP | 2014461 A1 | 1/2009 |
| EP | 2230190 A1 | 9/2010 |
| EP | 2292524 A1 | 3/2011 |
| EP | 2599735 A1 | 6/2013 |
| FR | 2916157 A1 | 11/2008 |
| FR | 2943322 A1 | 9/2010 |
| GB | 1216991 A | 12/1970 |
| GB | 2353986 A | 3/2001 |
| GB | 2501967 A | 11/2013 |
| JP | H09110077 A | 4/1997 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| TW | 201217237 A | 5/2012 |
| WO | 9905041 A1 | 2/1999 |
| WO | 0066450 A1 | 11/2000 |
| WO | 2005009868 A1 | 2/2005 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008118569 A2 | 10/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |
| WO | 2013134665 A1 | 9/2013 |

(56) References Cited

FOREIGN PATENT DOCUMENTS

| WO | 2015/119988 A1 | 8/2015 |
|----|----------------|--------|
| WO | 2017155946 A1 | 9/2017 |

OTHER PUBLICATIONS

U.S. Appl. No. 15/554,240, entitled "Tabbed Seal Concepts," which entered the U.S. national phase from International Application No. PCT/US2016/020666, filed on Mar. 3, 2018, which published as US 2018/0079576 A1 on Mar. 22, 2018.

U.S. Appl. No. 15/794,719, entitled "Tabbed Inner Seal," filed Oct. 26, 2017, which published as US 2018/0118439 A1 on May 3, 2018.

U.S. Appl. No. 15/998,855, entitled "Tabbed Seal for Beverage Pod," filed Aug. 17, 2018, which published as US 2019/0055070 A1 on Feb. 21, 2019.

U.S. Appl. No. 16/197,753, entitled "Inner Seal With a Sub Tab Layer," filed Nov. 21, 2018, which is a continuation of U.S. Appl. No. 15/598,780, entitled "Inner Seal With a Sub Tab Layer," filed on May 18, 2017, which published as US 2017/0253373 A1 on Sep. 7, 2017 and issued as U.S. Pat. No. 10,150,589 B2 on Dec. 11, 2018, which is a continuation of U.S. Appl. No. 14/208,122, entitled "Inner Seal With a Sub Tab Layer," filed on Mar. 13, 2014, which published as US 2014/0263323 A1 on Sep. 18, 2014 and issued as U.S. Pat. No. 9,676,513 B2 on Jun. 13, 2017.

U.S. Appl. No. 16/262,406, entitled "Tamper Evident Tabbed Sealing Member Having a Foamed Polymer Layer," filed Jan. 30, 2019, which is a division of U.S. Appl. No. 14/706,263, entitled "Tamper Evident Tabbed Sealing Member Having a Foamed Polymer Layer," filed May 7, 2015, which published as US 2015/0232229 A1 on Aug. 20, 2015 and issued as U.S. Pat. No. 10,196,174 B2 on Feb. 5, 2019, which is a Division of U.S. Appl. No. 13/603,998, entitled "Tamper Evident Tabbed Sealing Member Having a Foamed Polymer Layer," which published as US 2014/0061196 A1 on Mar. 6, 2014 and issued as U.S. Pat. No. 9,028,963 B2 on May 12, 2015.

U.S. Appl. No. 16/345,048, entitled "Sealing Member for Use With Fat Containing Compositions," which entered the U.S. national phase from International Application No. PCT/US2017/058721, filed on Oct. 27, 2017.

Patent Cooperation Treaty, International Search Report and Written Opinion of the International Search Authority for International Application PCT/US2017/058521 dated Dec. 27, 2017, 12 pages.

European Patent Office, Extended European Search Report for European Application EP 17864669.1 dated May 18, 2020, 9 pages.

U.S. Appl. No. 16/564,064, entitled "Enhancements for Tabbed Seal," filed Sep. 9, 2019.

U.S. Appl. No. 16/736,912, entitled "Tabbed Seal Concepts," filed Jan. 8, 2020, which published as US 2020/0140176 A1 on May 7, 2020, which is a Continuation of U.S. Appl. No. 15/554,240, entitled "Tabbed Seal Concepts," which entered the U.S. national phase from International Application No. PCT/US2016/020666, filed on Mar. 3, 2016, which published as US 2018/0079576 A1 on Mar. 22, 2018.

FIG. 4
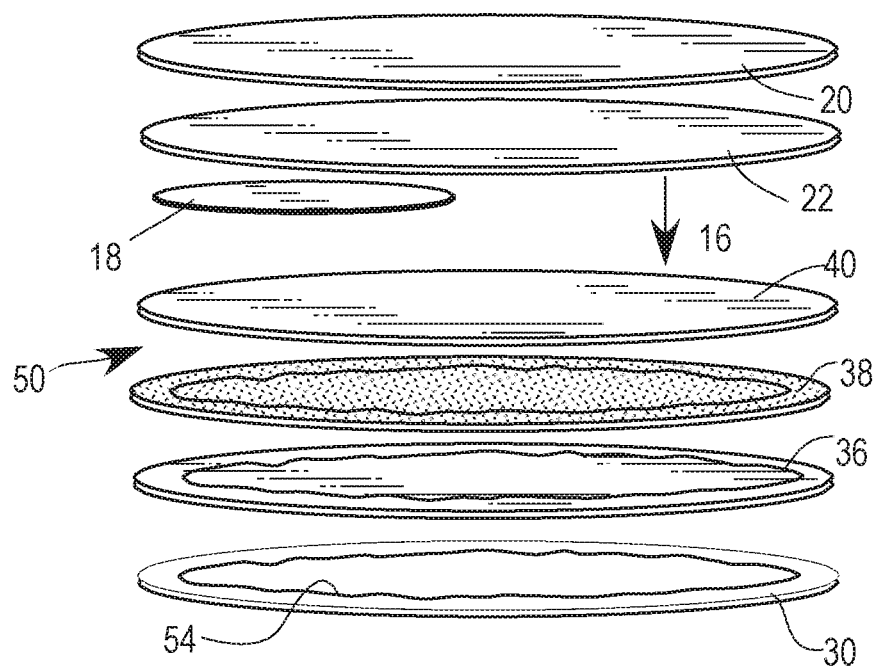
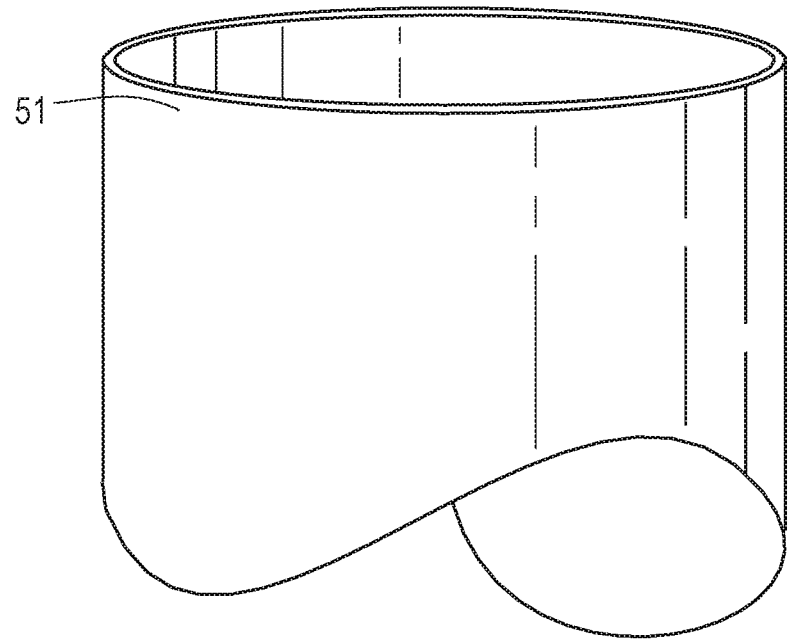

SINGLE ALUMINUM TAMPER INDICATING TABBED SEALING MEMBER

CROSS-REFERENCE TO RELATED APPLICATIONS

This application is a U.S. national phase application filed under 35 U.S.C. § 371 of International Application Number PCT/US2017/058521, filed Oct. 26, 2017, designating the United States, which claims the benefit of U.S. Provisional Application No. 62/414,547, filed Oct. 28, 2016.

FIELD

The disclosure relates to sealing members for use as secondary closures on containers, and more particularly, to tamper indicating tabbed sealing members.

BACKGROUND

It is often desirable to seal the opening of a container using a removable or peelable seal, sealing member, or inner seal. Often a cap or other closure is then screwed or placed over the container opening capturing the sealing member therein. In use, a consumer typically removes the cap or other closure to gain access to the sealing member and then removes or otherwise peels the seal from the container in order to dispense or gain access to its contents.

In some cases, the inner seal provides tamper evidence whereby a portion of the seal remains on the container as evidence that the sealing member has been removed or tampered with. For instance, upon removal of the sealing member from the container, the laminate forming the sealing member is designed to rupture and leave debris on the container finish to indicate that the package has been opened. Prior examples of such tamper evident tabbed liners resulted in laminates that left debris on the container directly dependent on the placement of the tab. For example, if the tab was on the top of the sealing member and defined wholly within its perimeter and covering approximately 50 percent of the seal, then prior seals generally left debris on the container land area and also covering over approximately 50 percent of the container opening. The consumer would then need to remove this remaining seal portion in order to effectively use the container, which tended to serve as a nuisance to some consumers and in some applications.

BRIEF DESCRIPTION OF THE DRAWINGS

FIG. 4 is an exploded cross section of a tabbed sealing member of the disclosure with the relative location of residual material that would be left on the container rim land area;

DETAILED DESCRIPTION

Figure 1:
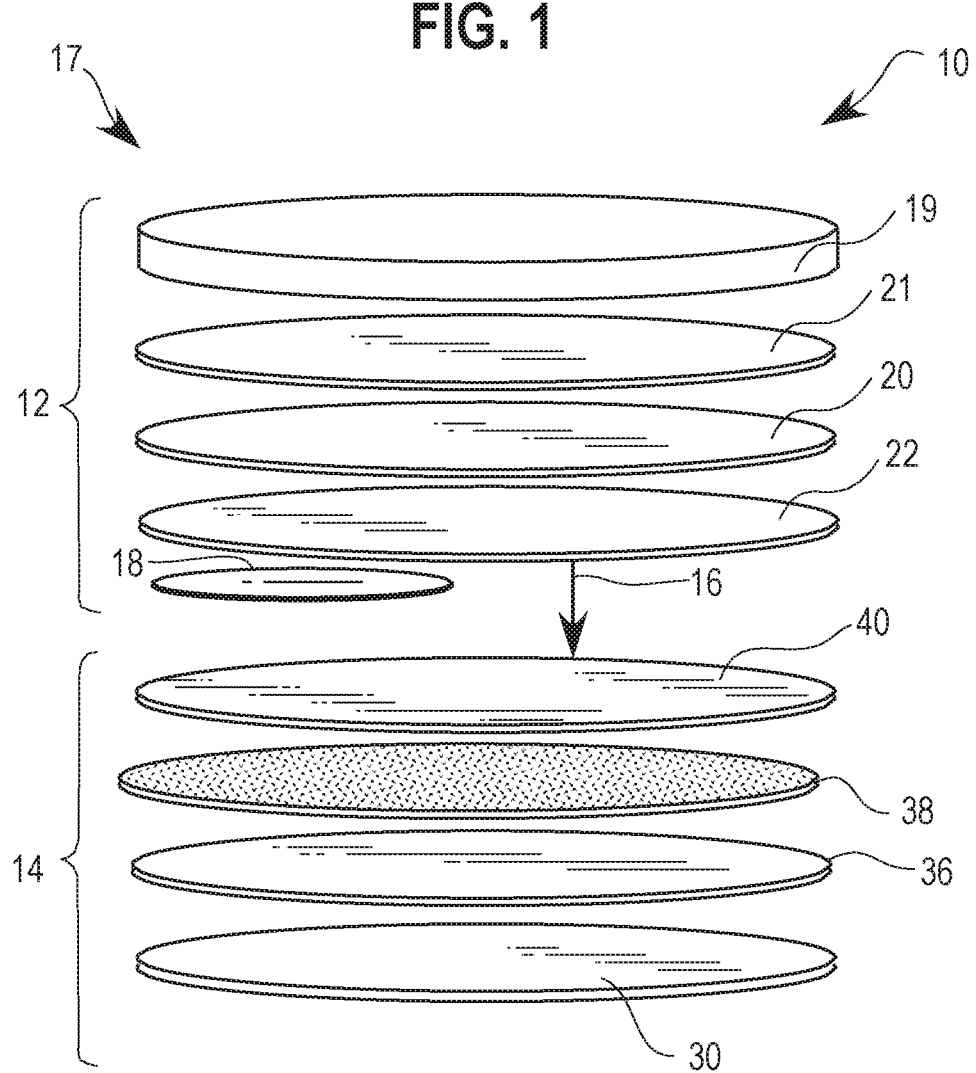
FIG. 1 is an exploded cross-section view of an exemplary tabbed sealing member of the disclosure.

The present disclosure generally relates to tabbed sealing members having a gripping tab defined wholly within a perimeter of the seal that are also configured to provide tamper evidence. The sealing members herein eliminate the excessive debris left by prior tamper evident top-tabbed type inner seals. In one aspect, the sealing members herein are arranged and configured to isolate the residual debris, after removal of the sealing member from the container via the tab, to the land region of the container rim independent of the size or positioning of the tab on the top surface of the sealing member. In another aspect, the tabbed sealing members herein utilize a unique layered assembly to aid in achieving the isolated debris left as a ring of sealant and aluminum layer on the container rim.

In a preferred approach, a laminate is configured upon removal from the container to leave a residue of sealant and aluminum remnants isolated to the container finish, which controls the amount of residual liner remaining on the container after opening. Preferably, the isolated remnants are a thin annular ring of the sealant and aluminum layer. Reducing the land areas and also stepping in the container finish help to reduce the removal force of this design. That is, the top surface area of the container rim land area may be reduced. The separation functionality is controlled by the gauge of the aluminum in the base layer and the selection of the adhesive between the layers.

By one approach, the tabbed sealing member includes the lamination of a base foil layer and sealant component that is bonded to a support to form a tamper evident substructure. The bonding may be by extrusion lamination or thermal lamination. Optional layers may then be applied to the tamper evident substructure, such as foam layers, non-foam polymer layers, and various tab components to form a tamper evident sealing member configured to isolate the residual debris to the container rim.

For simplicity, this disclosure generally may refer to a container or bottle, but the sealing members herein may be applied to any type of container, bottle, package or other apparatus having a rim or mouth surrounding an access opening to an internal cavity. In this disclosure, reference to upper and lower surfaces and layers of the components of the sealing member refers to an orientation of the components as generally depicted in the figures and when the sealing member is in use with a container in an upright position and having an opening at the top of the container. Different approaches to the sealing member will first be generally described, and then more specifics of the various constructions and materials will be explained thereafter. It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing member temporarily bonded to a liner. In this construction, the sealing member is bonded to a container's rim, and the liner is configured to separate from the sealing member during heating to be retained in a cap or other closure used on the container. In a two-piece construction, a wax layer, for example, may be used to temporarily bond the sealing member to a liner. Other types of releasable layers may also be used to provide a temporary bond between the seal and liner, but the releasable layers are generally heat activated.

Turning to FIG. 1, one example of a tamper evident tabbed sealing member 10 is shown. Seal 10 includes an upper laminate 12 partially bonded to a lower laminate 14 via a partial bond 16 to form a gripping tab 17 defined wholly within a perimeter of the seal. In this approach, the seal also includes a partial layer or tab stock 18 to aid in forming the tab 17. The tab stock 18 is bonded to layers in the upper laminate 12 but not bonded to layers in the lower laminate 14. Further, as shown in FIG. 1, in one approach, the tabbed sealing member 10 may also include a pulp backing 19 and a wax layer 21. Once installed on a container, the pulp backing 19 and/or wax layer 21 may separate from the remainder of the sealing member 10 to permit a user to access the tab 17.

The upper laminate 12 may also include a polymer film support layer 20 to provide structural support and a co-polymer layer or bonding layer 22 to bond the polymer film 20 to the lower laminate 14. Here, the film 20 is partially bonded to the tab stock 18 and partially bonded to the lower laminate via the bonding layer 22.

Support film layer 20 may be polyethylene terephthalate (PET), nylon, polyolefin, or other structural polymer layer and may be, in some approaches, about 0.5 to about 2.5 mils thick.

When using the tab stock 18, the tab 17 is defined or formed via the tab stock 18 that extends only part way across the upper laminate 12. More specifically, the tab stock 18 forms the tab 17 because it bonds to the bonding layer 22 and generally prevents layer 20 (and any layers above) from adhering to the upper surface of the lower seal laminate 14 (or any layers therebetween) across at least a portion thereof. A bottom surface of tab stock 18 is adjacent to, but not bonded to, the upper surface of the lower laminate 14 to form the tab 17.

In one aspect, the tab stock 18 is formed of polyester, such as polyethylene terephthalate (PET), or paper. By one optional approach, a lower surface of the tab stock 18 may be coated with a release material, for example silicone. The optional release coating minimizes the possibility that the tab stock 18 will become adhered to the upper surface of the lower laminate 14 during the heat sealing or induction heat sealing process. The tab stock 18 permits the tab structure 17 to pivot or hinge upwardly along a boundary line to form the tab 17. By this approach, the tab stock 18 and formed tab 17 are defined wholly within a circumference or perimeter of the seal.

The bonding layer 22 may include any polymer materials that adhesively bond, are heat activated, or heated to achieve its bonding characteristics or application to the seal. By one approach, the bonding layer 22 may be selected from ethylene vinyl acetate (EVA), polyolefin, 2-component polyurethane, ethylene acrylic acid copolymers, curable two-part urethane adhesives, epoxy adhesives, ethylene methacrylate copolymers and the like bonding materials. As shown, the activated bonding layer 22 extends the full width of the laminate segment 12. In other approaches, the laminate 12 may only include a partial layer of adhesive and, thus, not use the tab stock layer 18 discussed above.

By one approach, the bonding layer 22 is EVA with a vinyl acetate content of about 20 to about 28 percent with the remaining monomer being ethylene in order to achieve the bond strengths to securely hold the upper laminate to the lower laminate. In some cases, a vinyl acetate content lower than 20 percent is insufficient to form the robust structures described herein. By one approach, bonding layer 22 may be about 0.5 to about 3.5 mils of EVA, in other approaches about 0.5 to about 2.5 mils of EVA, in other approaches, about 0.5 to about 1.5 mils of EVA and, in yet other approaches, about 0.5 to about 1.0 mils of EVA; however, the thickness can vary as needed for a particular application to achieve the desired bonds and internal strength.

The lower laminate 14 forms the tamper evident substructure of the unique tamper evident sealing member 10. This substructure includes a lower sealant or heat seal layer 30 that may be composed of any material suitable for bonding to the rim of a container, such as but not limited to induction, conduction, or direct bonding methods. Suitable adhesives, hot melt adhesives, or sealants for the heat sealable layer 30 include, but are not limited to, polyesters, polyolefins, ethylene vinyl acetate, ethylene-acrylic acid copolymers, surlyn, ionomers and other suitable materials. By one approach, the heat sealable layer may be a single layer or a multi-layer structure of such materials about 0.2 to about 3 mils thick. By some approaches, the heat seal layer is selected to have a composition similar to and/or include the same polymer type as the composition of the container. For instance, if the container includes polyethylene, then the heat seal layer would also contain polyethylene. If the container includes polypropylene, then the heat seal layer would also contain polypropylene. Other similar materials combinations are also possible. By one approach, the seal layer 30 is about 1 to about 2 mils thick or, in some approaches, about 1.5 mils thick medium density polyethylene film (in some cases about 0.92 to about 0.94 g/cm, but may be other density as needed).

Next, the sealing member includes a bonding layer 36 (or hot melt adhesive). The correct separation of the sealing member to isolate the residue to the container land area may be impacted by the selection of this bonding layer 36. Thickness of this layer also helps achieve the unique functionality of the seals herein. The hot melt layer may have a thickness from about 1 to about 3 mils. Layer 36 helps to maintain lamination integrity to hold the seal component together. Suitable examples of materials for the bonding layer 36 include co-extruded polyethylene/EVA sealants having a high vinyl acetate composition (such as about 20 to about 40 percent). Other suitable materials for the bonding layer 36 may include EVA hot melts, EAA coatings, or PET heat seal films. In one particular form, the bonding layer 36 is EVA-based hot melt.

Above the bonding layer 36 there is a foil component or membrane layer 38 and an upper polymer support component 40. The membrane layer 38 may be one or more layers configured to provide induction heating and/or barrier characteristics to the seal 10. A layer configured to provide induction heating is any layer capable of generating heat upon being exposed to an induction current where eddy currents in the layer generate heat. By one approach, the membrane 38 may be a metal layer, such as, aluminum foil, tin, and the like. In other approaches, the membrane layer may be a polymer layer in combination with an induction heating layer. The membrane layer 38 may also be or include an atmospheric barrier layer capable of retarding the migration of gases and moisture at least from outside to inside a sealed container and, in some cases, also provide induction heating at the same time. Thus, the membrane layer 38 may be one or more layers configured to provide such functionalities. By one approach, the membrane layer 38 is about 0.3 to about 2 mils of a metal foil, such as aluminum foil, which is capable of providing induction heating and to function as an atmospheric barrier. In one particular approach, the member layer 38 is a 1 mil thick aluminum foil. There is some advantage in reducing the gauge of the aluminum component in the base foil laminate or substructure. Thinner aluminum foil is easier to break and the use of thinner foil reduces the force required by the consumer to peel the liner from the container. In some approaches, the membrane layer 38 is thinner than the lower heat seal layer.

The upper polymer support component 40 may be films, foams, or other support materials. For instance, component 40 may be a polymer foam or a non-foamed polymer film, such as polyolefin, or polyester films or foams. In one form, the polymer support component 40 may comprise a plurality of layers such as, for example, a PET layer and an adhesive layer, such as EVA. According to one form, the polymer support layer 40 includes a co-extruded PET layer having an amorphous PET portion and a crystalline PET portion. Further, this form may also include an EVA layer in combination with the co-extruded PET layer.

In yet another form, component 40 may be an insulation layer or a heat-redistribution layer. In one form, component 40 may include a foamed polymer layer. Suitable foamed polymers include foamed polyolefin, foamed polypropylene, foamed polyethylene, and polyester foams. In some forms, these foams generally have an internal rupture strength of about 2000 to about 3500 g/in. In some approaches, the foamed polymer layer 106 may also have a density less than 0.6 g/cc and, in some cases, about 0.4 to less than about 0.6 g/cc. In other approaches, the density may be from about 0.4 g/cc to about 0.9 g/cc. The foamed polymer layer may be about 1 to about 5 mils thick.

In some approaches, the break-in or rupture force of the seal layers that remain on the container is proportional to the sealant areas available on the container land region of the container.

Figure 2:
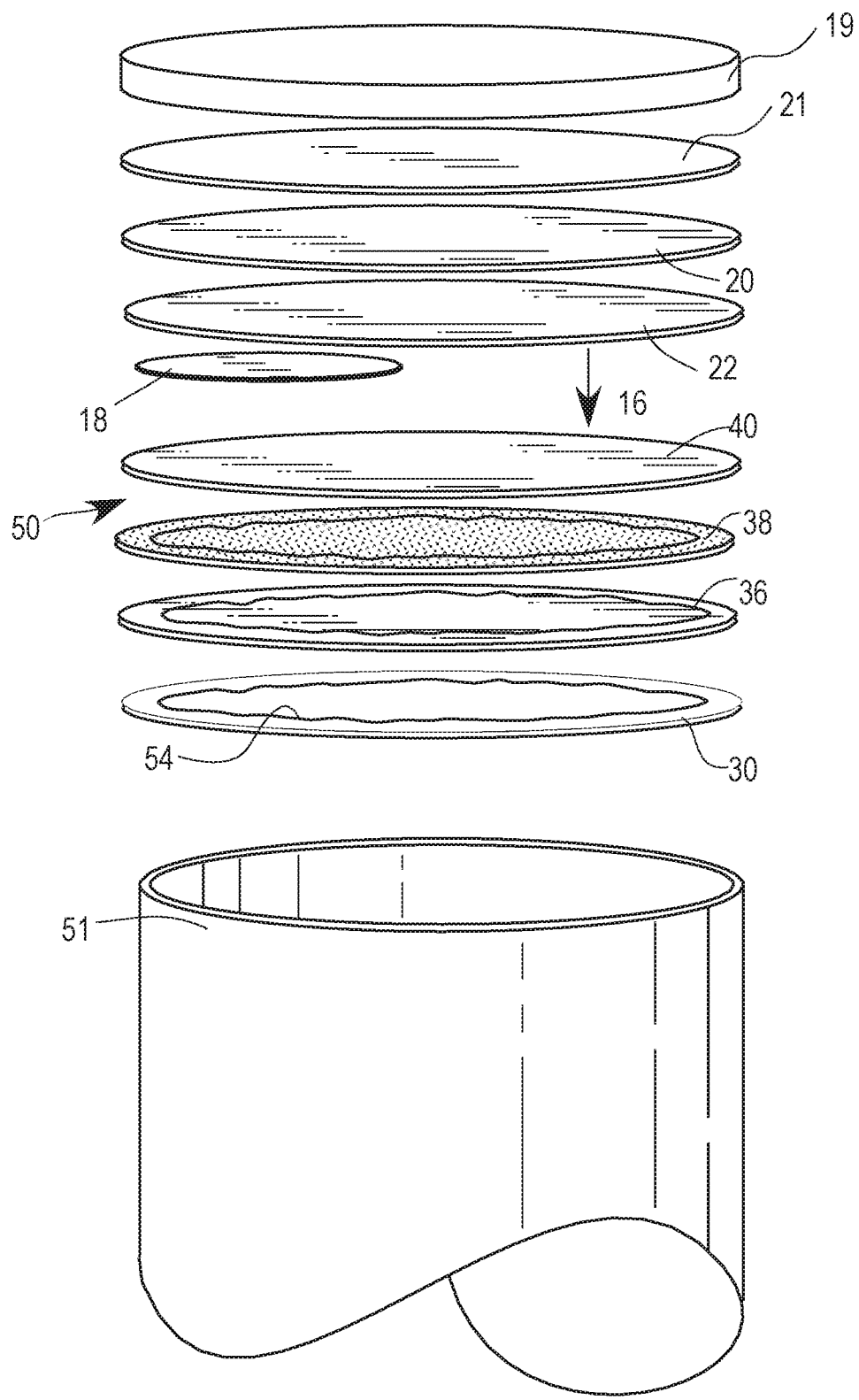
FIG. 2 is an exploded cross section of a tabbed sealing member of the disclosure with the relative location of residual material that would be left on the container rim land area.

FIG. 2 shows an alternative embodiment of the tabbed sealing members herein. Various layers in FIG. 2 are similar to FIG. 1 and will not be described further. Some of the layers in FIG. 2 may be different in thickness such as a foil layer that is 0.5 mil or less, but can be the same as that described above.

Figure 5:
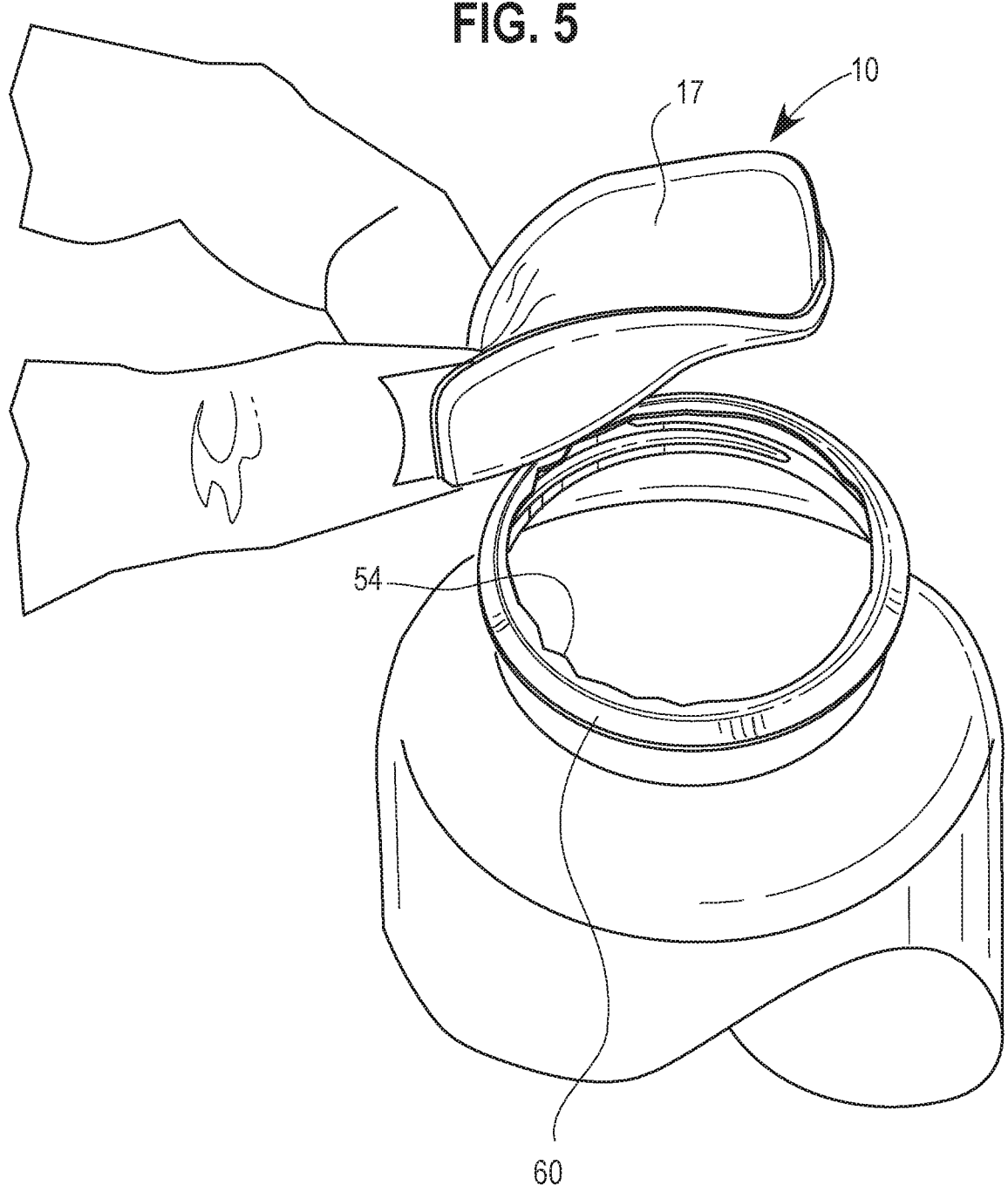
FIG. 5 is an image showing a tabbed sealing member removed from a container with residual material left on the container rim land area.

FIG. 2 also shows where the laminate ruptures upon sealing member removal to isolate the residue on the container land area. The laminate separates at 50 where the support component 40 peels away from the membrane layer 38 above the container rim land area (generally shown as 51). Then, the membrane layer 38, bonding layer 36, and lower sealant 30 rupture internally 54 along the inner edges of the container rim all around the rim. This separation isolates the sealing member residue 60 as a ring of material on the container rim as best shown in the image of FIG. 5.

It should be appreciated that the bond strengths between the various layers as well as the tear strengths of the layers may be chosen such that a portion of the lower laminate ruptures to provide the residual ring of material on the container rim. In this form, the bond strength between the various layers in the tamper evident lower laminate substructure is greater than the tear strength of the layers in the tamper evident lower laminate substructure except for the upper polymer support layer such that upon removing the sealing member from a container, the upper polymer support layer separates from at least a portion of the primary metal layer to isolate a residual ring of material on the container land area comprising the lowermost heat seal layer, the bonding layer, and the primary metal layer.

Further, as shown in FIG. 2, the bond strength between the upper polymer support 40 is less than the bonds between the membrane layer 38, the bonding layer 36, and the heat seal 30. In this form, the outermost portions of the membrane layer 38, the bonding layer 36, and the heat seal 30 remain bonded to the container while the polymer support 40 separates from the foil 38 at the outermost edges while maintaining the bond to the foil layer 38 inwardly from the outermost edge. In this form, the ruptured material from the membrane layer 38, the bonding layer 36, and the heat seal 30, positioned inwardly from the outermost edge, will remain bonded to the upper polymer support 40.

In some approaches, there is a small overhang or annular flange of the sealing member extending beyond the container rim when sealed to the container rim. In some approaches, this overhang may be about 1 to about 3 mm. In other approaches, the container finish may be stepped inwardly so that the upper land area is reduced forming the overhang of material. This overhang of material is generally illustrated in FIG. 5.

In some approaches, the following features define the sealing members herein. The various features and limitations of the sealing members described above, in the Figures, and discussed below are not exclusive to the mentioned sealing member, but may be included in any combination thereof. Mention of an aspect or embodiment of the seals or container herein is not intended to imply that such aspect or embodiment is mutually exclusive of all other aspects or embodiments. In other words, the various features as set forth herein may be united in various combinations as needed for a particular application and features in one paragraph may be combined with features in other paragraphs as needed.

Figure 3:
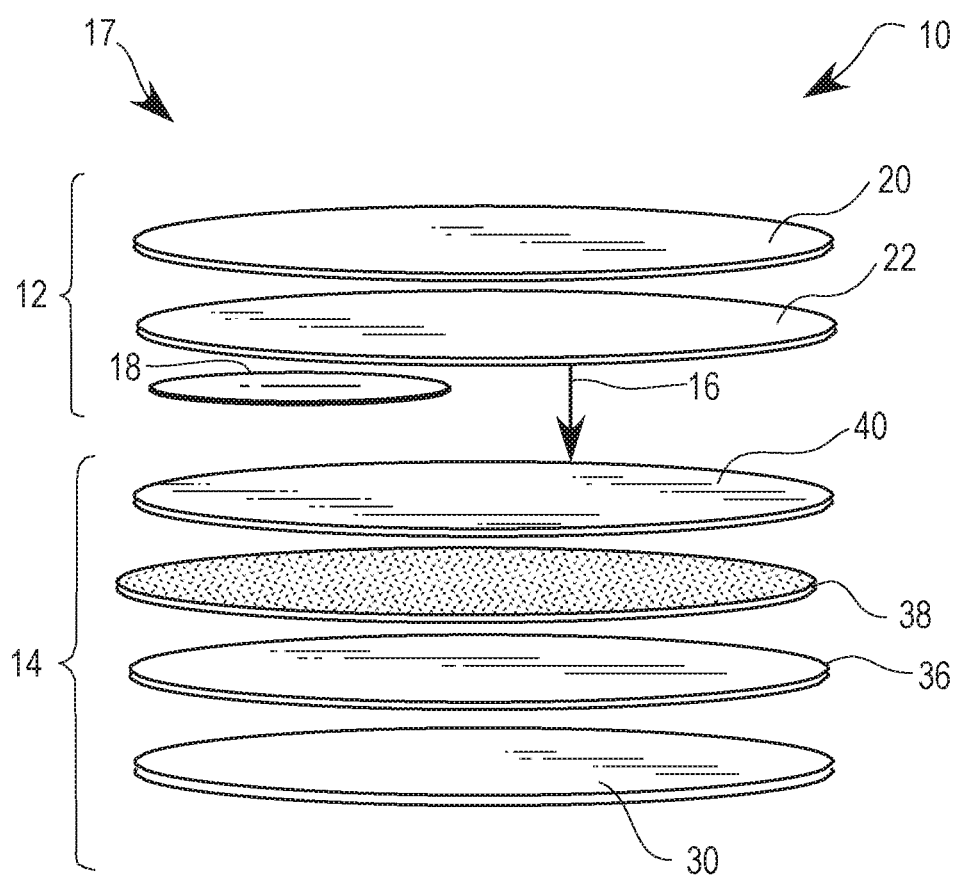
FIG. 3 is an exploded cross-section view of an exemplary tabbed sealing member of the disclosure.

A further embodiment is shown in FIGS. 3 and 4. The embodiment shown in FIG. 3 is different from the embodiment shown in FIG. 1 in that the embodiment in FIG. 3 does not include a pulp layer or wax layer. It should be appreciated that various layers in FIG. 3 are similar to FIG. 1 and will not be described further.

Figure 6:
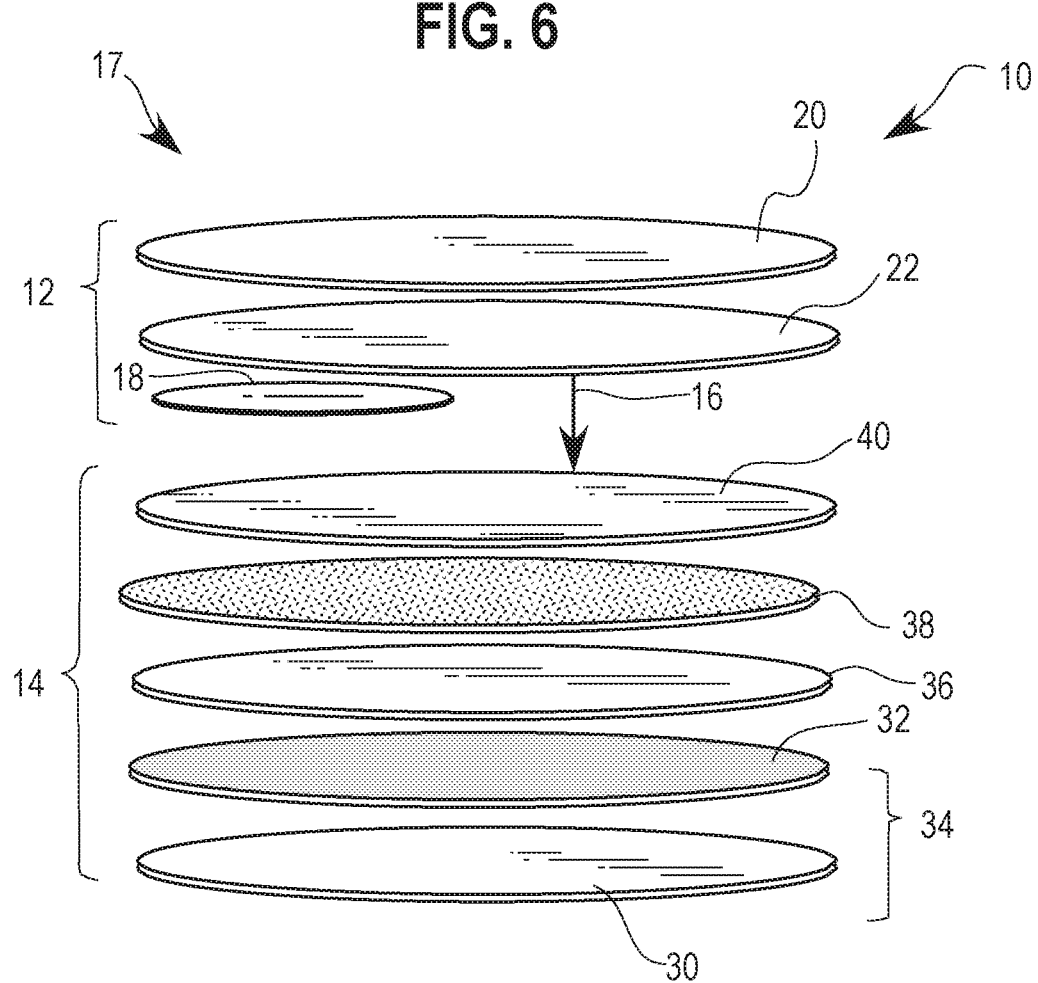
FIG. 6 is an exploded cross-section view of another exemplary tabbed sealing member of the disclosure.

Yet another embodiment is shown in FIG. 6 having additional features beyond those shown in the embodiment in FIG. 3. For example, the embodiment in FIG. 6 includes colored polymer layer 32. This colored polymer layer 32 can provide further tamper indication when the tabbed sealing member is removed.

Figure 8:
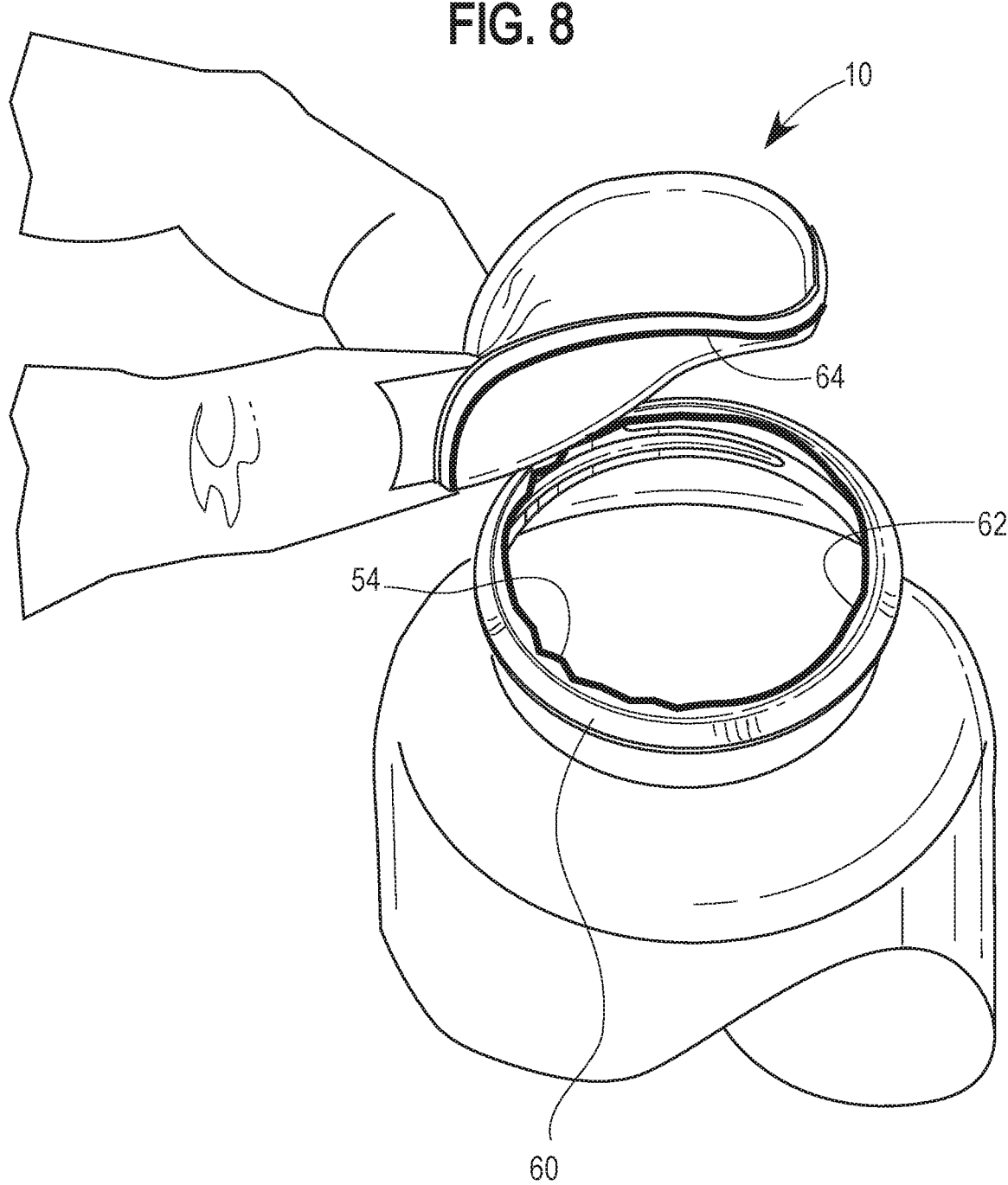
FIG. 8 is an image showing another tabbed sealing member removed from a container with residual material left on the container rim land area.

The colored polymer layer 32 can take a variety of forms, such as a medium density polyethylene layer. The colored polymer layer 32 may also be co-extruded with one or more layers and/or may otherwise be adhered to one or more layers in the lower laminate 14. For example, in one form, the colored polymer layer 32 may be adhered to the heat seal, such as at 34. Further, the colored polymer layer 32 may be located in other positions in the lower laminate 14 as long as the colored polymer layer is torn to provide further tamper indication. For example, as shown in FIG. 8, when the seal is removed, a portion of the colored polymer layer 32 is visible on the land area, such as at 62, and visible on the removed portion of the seal, such as at 64. The colored polymer layer 32 may include a color that contrasts with colors from at least some of the other layers in the laminate.

Figure 7:
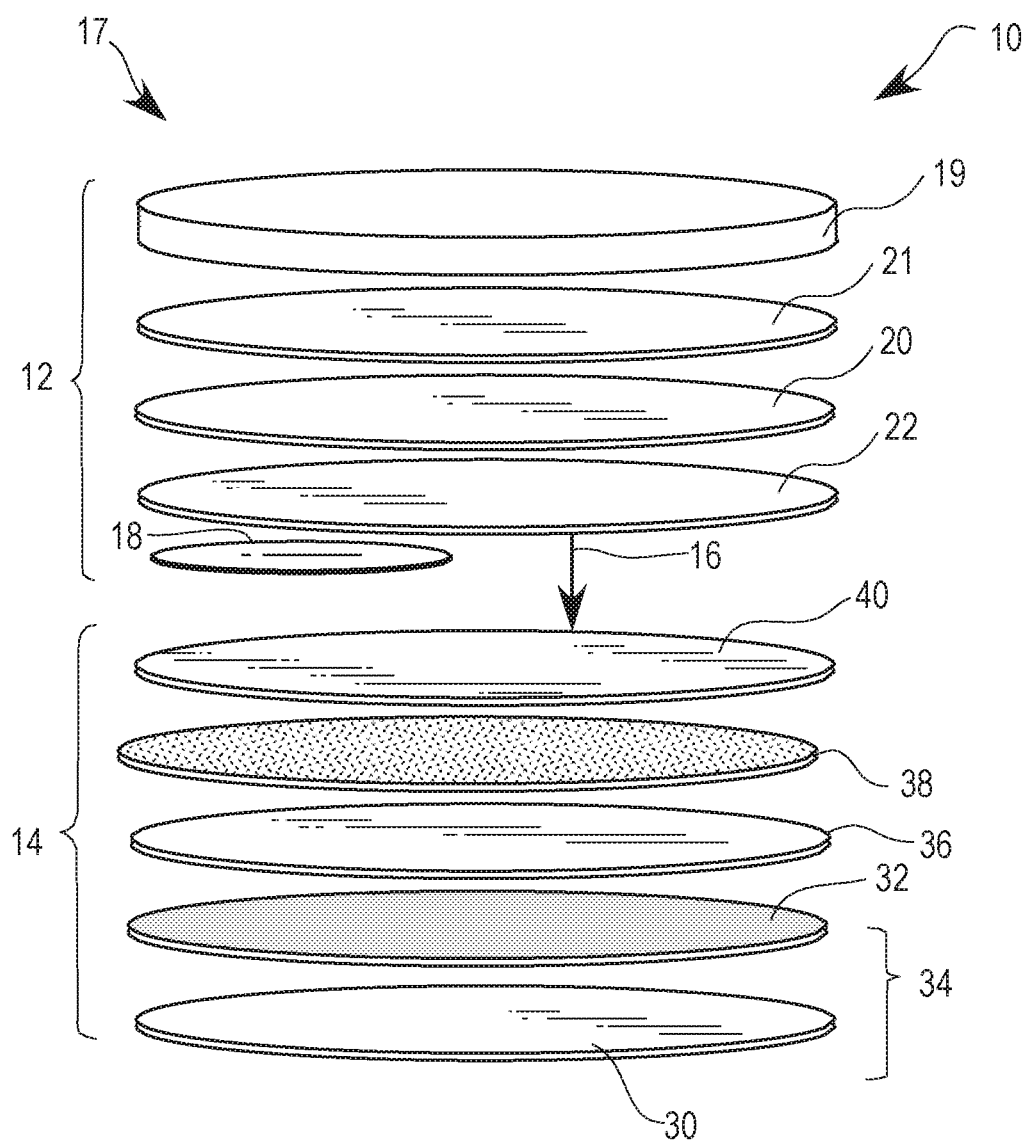
FIG. 7 is an exploded cross-section view of another exemplary tabbed sealing member of the disclosure.

Yet another embodiment is shown in FIG. 7. This embodiment is similar to the embodiment of FIG. 1 in that the pulp layer 19 and wax layer 21 are included. This embodiment also includes a colored polymer layer 32 and provides similar functionality as described in FIGS. 6 and 8. It should be appreciated that various layers in FIG. 7 are similar to FIGS. 1 and 6 and will not be described further.

In one form, embodiment, or version, a tamper evident tabbed sealing member for sealing to a rim surrounding a container opening is provided that includes one or more foil layers. This sealing member may include a multi-layer laminate with an upper laminate portion partially bonded to a tamper evident lower laminate substructure to form a gripping tab in the upper laminate portion defined wholly within a perimeter of the sealing member. The gripping tab is configured for removing the sealing member from a container opening. The tamper evident lower laminate substructure below the gripping tab including at least a heat seal layer for bonding to the container rim, a primary metal layer positioned for heating the heat seal layer, a bonding layer, and an upper polymer support layer; and upon the sealing member removal from a container, the metal layer and the heat seal layer separate from the polymer support layer to isolate a residual ring of material that remains on the container land area.

The tamper evident tabbed sealing member above may also include the isolated residual ring of material being independent of the size or positioning of the tab, wherein the upper polymer support layer is a polyolefin film or polyolefin foam layer or a multi-layer laminate including both film and foam components, wherein the heat seal layer is polyester, polyolefin, ethylene vinyl acetate, ethylene-acrylic acid copolymers, ionomers, medium density polyethylene, and combinations thereof, wherein the lower heat seal layer is about 0.2 to about 3 mils thick, wherein the primary metal layer is thinner than the heat seal layer, wherein the primary metal layer is about 0.3 to about 2 mils thick, wherein a bond of the polymer support component to the metal layer is less than a bond of the polymer support component to the upper laminate bonding layer in at least the portions above the container rim land area, further comprising a partial layer tabstock forming the tab due to the tabstock bonded to the upper laminate but not bonded to the tamper evident lower laminate substructure below the tabstock, and/or any combinations of the above features.

In form, embodiment, or versions, a sealed container is described with a foil layer tamper evident tabbed sealing member. This sealing container may include a container defined by a wall and having an inwardly stepped finish with an upper land area surrounding a container opening, the upper land area of the inwardly stepped finish is thinner than the container wall. The container may also include a tamper evident tabbed sealing member sealed to the upper land area rim, the tamper evident tabbed sealing member including a multi-layer laminate including an upper laminate portion partially bonded to a tamper evident lower laminate substructure to form a gripping tab in the upper laminate portion defined wholly within a perimeter of the sealing member, the gripping tab for removing the sealing member from a container opening; and the tamper evident lower laminate substructure below the gripping tab including at least a heat seal layer for bonding to the container rim, a metal layer positioned for heating the heat seal layer, a bonding layer above the primary metal layer, and an upper polymer support layer. Upon the sealing member removal from a container, a portion of the primary metal layer and the bonding layer separate from the polymer support component to isolate a residual ring of material that remains on the container land area.

The container may also include the isolated residual ring of material being independent of the size or positioning of the tab, wherein the upper polymer support layer is a polyolefin film or polyolefin foam layer or a multi-layer laminate including both film and foam components, wherein the heat seal layer is polyester, polyolefin, ethylene vinyl acetate, ethylene-acrylic acid copolymers, ionomers, medium density polyethylene, and combinations thereof, wherein the lower heat seal layer is about 0.2 to about 3 mils thick, wherein the metal layer is thinner than the heat seal layer, wherein the metal layer is about 0.3 to about 2 mils thick, wherein a bond of the polymer support component to the metal layer is less than a bond of the polymer support component to the upper laminate bonding layer in at least the portions above the container rim land area. The sealed container may also include the tabstock as mentioned above.

It will be understood that various changes in the details, materials, and arrangements of the process, liner, seal, and combinations thereof, which have been herein described and illustrated in order to explain the nature of the products and methods may be made by those skilled in the art within the principle and scope of the embodied product as expressed in the appended claims. For example, the seals may include other layers within the laminate and between the various layers shown and described as needed for a particular application. Adhesive layers not shown in the Figures may also be used, if needed, to secure various layers together. Unless otherwise stated herein, all parts and percentages are by weight.

What is claimed is:

1. A tamper evident tabbed sealing member for sealing to a rim surrounding a container opening, the sealing member comprising:
    a multi-layer laminate including an upper laminate portion partially bonded to a tamper evident lower laminate substructure to form a gripping tab via an unbonded portion between the upper laminate portion and the lower laminate substructure, the tab defined wholly within a perimeter of the sealing member, the gripping tab for removing the sealing member from a container opening;
    the tamper evident lower laminate substructure positioned below the gripping tab and including at least a heat seal layer for bonding to the container rim, a primary metal layer positioned for heating the heat seal layer, a bonding layer below the primary metal layer, and an upper polymer support layer, the upper polymer support layer comprising a polyethylene terephthalate material coated with ethylene vinyl acetate, the upper polymer support layer bonded directly to the primary metal layer; and
    upon removing the sealing member from a container, the upper polymer support layer separates from at least a portion of the primary metal layer to isolate a residual ring of material on the container land area comprising material from the primary metal layer, the heat seal layer, and the bonding layer, wherein a bond strength of the polymer support layer to the primary metal layer is less than a bond strength of the polymer support layer to the upper laminate portion in a portion above the container rim land area.

2. The tamper evident tabbed sealing member of claim 1, wherein the isolated residual ring of material is independent of the size or positioning of the tab.

3. The tamper evident tabbed sealing member of claim 1, wherein the upper polymer support layer includes a polyethylene terephthalate film or polyethylene terephthalate foam layer or a multi-layer laminate including both film and foam components.

4. The tamper evident tabbed sealing member of claim 1, wherein the heat seal layer is polyester, polyolefin, ethylene vinyl acetate, ethylene-acrylic acid copolymers, ionomers, medium density polyethylene, and combinations thereof.

5. The tamper evident tabbed sealing member of claim 1, wherein the lower heat seal layer is about 0.2 to about 3 mils thick.

6. The tamper evident tabbed sealing member of claim 1, wherein the primary metal layer is thinner than the heat seal layer.

7. The tamper evident tabbed sealing member of claim 1, wherein the primary metal layer is about 0.3 to about 2 mils thick.

8. The tamper evident tabbed sealing member of claim 1, further comprising a partial layer tabstock forming a portion of the tab wherein the tabstock is bonded to the upper laminate but not bonded to the tamper evident lower laminate substructure below the tabstock.

9. The tamper evident tabbed sealing member of claim 1, further comprising a colored polymer layer in the tamper evident lower laminate substructure having a color that contrasts with at least some of the other layers in the tamper evident lower laminate substructure.

10. A sealed container comprising:
   a container defined by a wall and having an inwardly stepped finish with an upper land area surrounding a container opening, the upper land area of the inwardly stepped finish is thinner than the container wall; and
   a tamper evident tabbed sealing member sealed to the upper land area rim, the tamper evident tabbed sealing member including a multi-layer laminate including an upper laminate portion partially bonded to a tamper evident lower laminate substructure to form a gripping tab via an unbonded portion between the upper laminate portion and the tamper evident lower laminate substructure, the gripping tab defined wholly within a perimeter of the sealing member, the gripping tab for removing the sealing member from a container opening,
   the tamper evident lower laminate substructure below the gripping tab including at least a heat seal layer for bonding to the container rim, a primary metal layer positioned for heating the heat seal layer, a bonding layer below the primary metal layer, and an upper polymer support layer, the upper polymer support layer comprising a polyethylene terephthalate material coated with ethylene vinyl acetate, the upper polymer support layer bonded directly to the primary metal layer, and
   wherein upon the sealing member removal from a container, the upper polymer support layer separates from at least a portion of the primary metal layer to isolate a residual ring of material on the container land area comprising material from the primary metal layer, the heat seal layer, and the bonding layer, wherein a bond strength of the polymer support layer to the primary metal layer is less than a bond strength of the polymer support layer to the upper laminate portion in a portion above the container rim land area.

11. The container of claim 10, wherein the isolated residual ring of material is independent of the size or positioning of the tab.

12. The container of claim 10, wherein the upper polymer support layer includes a polyethylene terephthalate film or polyethylene terephthalate foam layer or a multi-layer laminate including both film and foam components.

13. The container of claim 10, wherein the heat seal layer is polyester, polyolefin, ethylene vinyl acetate, ethylene-acrylic acid copolymers, ionomers, medium density polyethylene, and combinations thereof.

14. The container of claim 10, wherein the lower heat seal layer is about 0.2 to about 3 mils thick.

15. The container of claim 10, wherein the primary metal layer is thinner than the heat seal layer.

16. The container of claim 10, wherein the primary metal layer is about 0.3 to about 2 mils thick.

17. The container of claim 10 further comprising a colored polymer layer in the tamper evident lower laminate substructure having a color that contrasts with at least some of the other layers in the tamper evident lower laminate substructure.

18. A laminate for forming a tamper evident tabbed sealing member for sealing to a rim surrounding a container opening, the laminate comprising:
   a tamper evident lower laminate substructure,
      the tamper evident lower laminate substructure including at least a lowermost heat seal layer, a primary metal layer positioned above the heat seal layer, a bonding layer between the primary metal layer and the lowermost heat seat layer, and an upper polymer support layer, the upper polymer support layer comprising a polyethylene terephthalate material coated with ethylene vinyl acetate, the upper polymer support layer bonded directly to the primary metal layer; and
   an upper laminate portion partially bonded to the tamper evident lower laminate substructure to form a gripping tab using an unbonded portion of the upper laminate portion, the gripping tab defined wholly within a perimeter of the sealing member when the laminate is formed into a sealing member,
   the bond strength between the layers in the tamper evident lower laminate substructure being greater than the tear strength of the layers in the tamper evident lower laminate substructure except for the upper polymer support layer such that upon removing the sealing member from a container, the upper polymer support layer separates from at least a portion of the primary metal layer to isolate a residual ring of material on the container land area comprising the lowermost heat seal layer, the bonding layer, and the primary metal layer.

* * * * *